(12) United States Patent
Rider et al.

(10) Patent No.: US 10,227,809 B2
(45) Date of Patent: Mar. 12, 2019

(54) TECHNOLOGIES FOR VEHICLE DOOR COLLISION AVOIDANCE

(71) Applicant: Intel Corporation, Santa Clara, CA (US)

(72) Inventors: Tomer Rider, Naahryia (IL); Hong Wei Teh, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/866,885

(22) Filed: Sep. 26, 2015

(65) Prior Publication Data
US 2017/0089114 A1 Mar. 30, 2017

(51) Int. Cl.
| | |
|---|---|
| *E05F 15/40* | (2015.01) |
| *E05F 15/60* | (2015.01) |
| *B60Q 9/00* | (2006.01) |
| *G01L 19/08* | (2006.01) |
| *G01L 19/14* | (2006.01) |
| *B60R 21/00* | (2006.01) |
| *B60R 13/04* | (2006.01) |
| *E05F 15/53* | (2015.01) |
| *E05F 15/611* | (2015.01) |

(52) U.S. Cl.
CPC .............. *E05F 15/40* (2015.01); *B60Q 9/008* (2013.01); *G01L 19/083* (2013.01); *G01L 19/14* (2013.01); *B60R 13/043* (2013.01); *B60R 2021/0006* (2013.01); *E05F 15/53* (2015.01); *E05F 15/611* (2015.01); *E05Y 2900/531* (2013.01)

(58) Field of Classification Search
None
See application file for complete search history.

(56) References Cited

U.S. PATENT DOCUMENTS

| | | | | |
|---|---|---|---|---|
| 9,457,747 | B1 * | 10/2016 | Marquette | ............... B60R 19/42 |
| 2005/0280284 | A1 * | 12/2005 | McLain | ................ B60R 13/043 |
| | | | | 296/146.1 |

(Continued)

FOREIGN PATENT DOCUMENTS

| | | | | |
|---|---|---|---|---|
| DE | 102011006011 | * | 9/2012 | ........... E05C 17/305 |
| DE | 102012021862 A1 * | 5/2013 | ........... B62D 35/001 |

(Continued)

OTHER PUBLICATIONS

DE102011006011 Spec., EPO machine translation (Nov. 3, 2016).*

(Continued)

*Primary Examiner* — Kevin P Mahne
(74) *Attorney, Agent, or Firm* — Barnes & Thornburg LLP

(57) ABSTRACT

Technologies for reducing vehicle door collisions include an in-vehicle compute device configured to determine a proximity between a door of a vehicle and a structure while the door is being opened and activate a door collision avoidance system of the vehicle to slow or restrict the opening of the door in response to a determination that the proximity of the door to the structure is within a proximity threshold. The door collision avoidance system may include one or more electro-magnets, one or more actuators, and/or one or more electro-active polymer devices. The in-vehicle compute device may also control the operation of the door based on a context of the vehicle.

22 Claims, 5 Drawing Sheets

(56) References Cited

U.S. PATENT DOCUMENTS

| | | | | |
|---|---|---|---|---|
| 2009/0033477 A1* | 2/2009 | Illium | ................ | B60R 21/0134 |
| | | | | 340/436 |
| 2011/0196568 A1* | 8/2011 | Nickolaou | ........ | B60W 30/0953 |
| | | | | 701/31.4 |
| 2012/0109454 A1* | 5/2012 | Fischer | ................. | B60Q 1/484 |
| | | | | 701/36 |

FOREIGN PATENT DOCUMENTS

| | | | | | |
|---|---|---|---|---|---|
| KR | 2013-0055785 | * | 5/2013 | ................ | B60J 5/04 |
| KR | 20130055785 A | * | 5/2013 | .............. | B60J 11/00 |
| KR | 20140025109 A | * | 3/2014 | ................ | B60J 5/04 |

OTHER PUBLICATIONS

DE102012021862 Spec., EPO machine translation (Nov. 4, 2016).*
KR20140025109 Spec., EPO machine translation (Nov. 2, 2016).*
KR20130055785 Spec., EPO machine translation (Nov. 4, 2016).*
KJ Mangetics Blog, Magnet Basics, p. 1-6, viewed Nov. 4, 2016.*
Lee, KR2013-055785, KIPO translation Jan. 10, 2018 (Year: 2018).*

* cited by examiner

TECHNOLOGIES FOR VEHICLE DOOR COLLISION AVOIDANCE

BACKGROUND

Typical vehicles include multiple doors to allow entry and exit from the vehicle. Most vehicle doors are configured to swing outwardly away from the body of the vehicle to allow egress from and ingress into the cabin of the vehicle. Unfortunately, collisions of the door with physical structures, such as other vehicles, guideposts, and railings, are common. Such door collisions can scratch or dent the door, reducing the value of the vehicle and rendering the damaged door unsightly.

To alleviate or reduce the damage caused to a vehicle door from a collision with a structure, some doors include bumpers or guards on the exterior of the door. However, such bumpers or door guards may be unappealing and may provide only minimal protection to the door.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
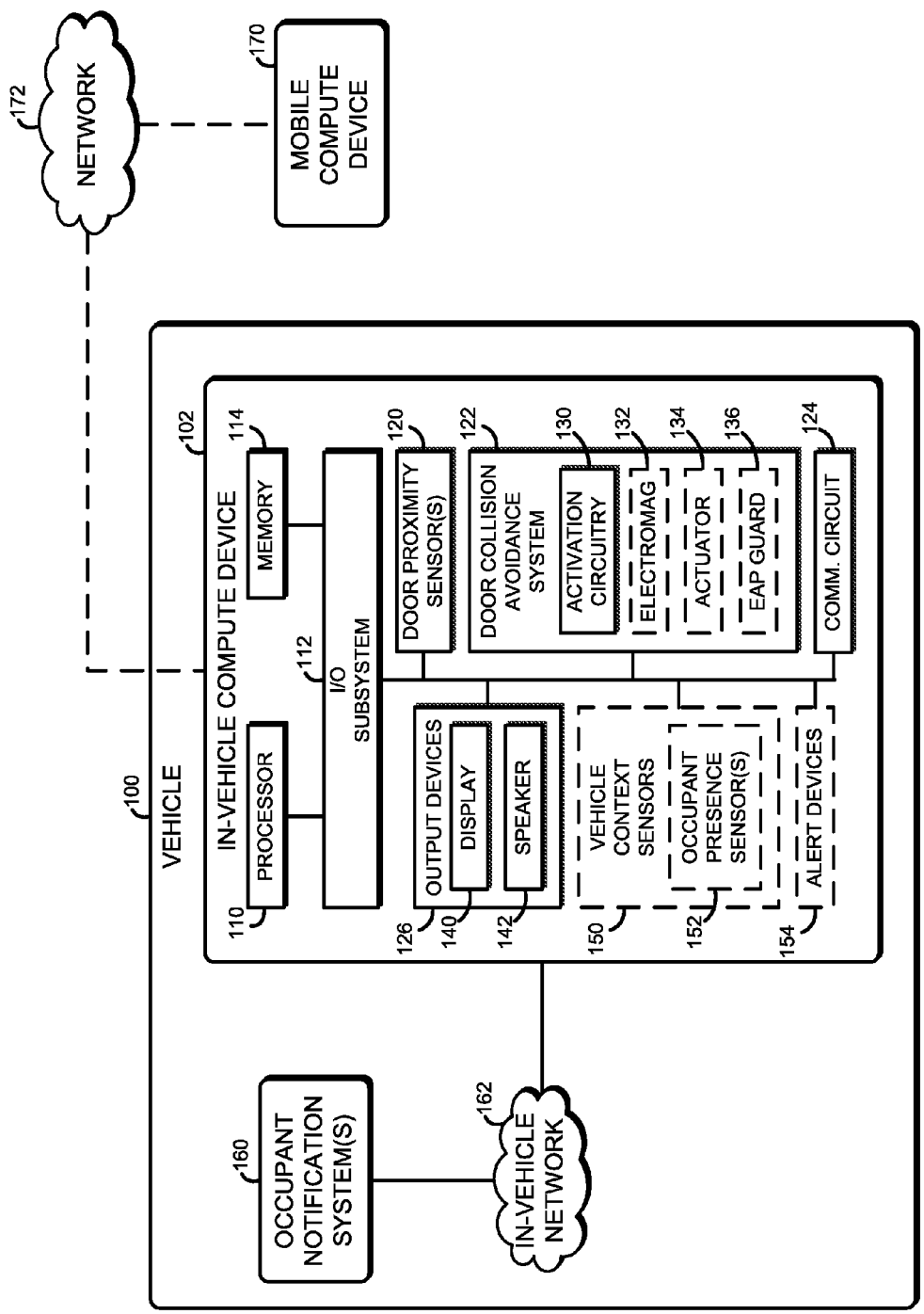
FIG. 1 is a simplified block diagram of at least one embodiment of an in-vehicle compute device for reducing vehicle door collisions.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, an in-vehicle compute device 102 is located in a vehicle 100 and configured to a determine the proximity of one or more doors of the vehicle 100 relative to one or more physical external structures while the door is being opened. If the in-vehicle compute device 102 determines that the monitored door is within a proximity threshold of the structure, the in-vehicle compute device 102 is configured to slow or stop the door from opening (e.g., by resisting an opening force from an occupant). To do so, the in-vehicle compute device 102 may activate a door collision avoidance system 122 to automatically slow or stop the door from opening (i.e., without direction or intervention from an occupant of the vehicle 100). As discussed in more detail below, the door collision avoidance system 122 includes one or more controllable devices configured to control movement of the door of the vehicle 100 or otherwise provide responsive protection to the door to avoid or reduce the likelihood of a collision between the door and the external structure. In this way, the in-vehicle compute device 102 provides an amount of protection from unintentional and/or unforeseeable vehicle door collisions (e.g., from children inattentively opening the door of the vehicle 100).

The in-vehicle compute device 102 may be embodied as any type of in-vehicle computer or computing system capable of performing the functions described herein For example, in some embodiments, the in-vehicle compute device 102 may be embodied as, or form a portion of, an in-vehicle infotainment system, a navigation system, and/or other vehicle-based computing system. In other embodiments, the in-vehicle compute device 102 may instead be embodied as a standalone computer device or computing system configured to interact with other systems of the vehicle 100. As illustratively shown in FIG. 1, the in-vehicle compute device 102 includes a processor 110, an input/ output ("I/O") subsystem 112, a memory 114, one or more proximity sensors 120, the door collision avoidance system 122, a communication circuit 124, and one or more output devices 126. Of course, the in-vehicle compute device 102 may include other or additional components, such as those commonly found in a typical in-vehicle computer (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the in-vehicle compute device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the in-vehicle compute device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the in-vehicle compute device 102, on a single integrated circuit chip (e.g., a microcontroller).

The door proximity sensors 120 may include, or otherwise be embodied as, one or more sensors, circuits, or other devices configured to generate proximity data indicative of the proximity of one or more doors of the vehicle 100 relative to a physical structure (e.g., another vehicle or vehicle door, a guide post, a railing, etc.) external to the vehicle 100. To do so, each proximity sensor 120 may utilize any suitable technology to generate the proximity data. For example, in the illustrative embodiment, one or more of the proximity sensors 120 is embodied as an inductive proximity sensor configured to generate proximity data in response to a metal structure being in proximity to the corresponding door of the vehicle 100. However, in other embodiments, the proximity sensors 120 may include other types of proximity sensors including, but not limited to capacitive-based proximity sensors, magnetic-based proximity sensors, RADAR-based proximity sensors, Sonar-based proximity sensors, Ultrasonic-based proximity sensors, optical-based proximity sensors (e.g., cameras), and/or other proximity sensors utilizing other types of proximity sensing technology to generate the proximity data. The proximity data generated or produced by the door proximity sensors 120 may be embodied as any type of data indicative of the proximity of the corresponding door of the vehicle 100 relative to one or more physical structures. In some embodiments, the proximity data may be embodied as distance data that directly defines a distance between the door of the vehicle 100 and the corresponding structure. However, in other embodiments, the proximity data may be embodied as various data from which a distance between the vehicle door and the physical structure may be inferred or otherwise determined. For example, in some embodiments, the proximity data may be embodied as a voltage or current signal generated or influenced by the presence of the physical structure and from which the proximity or distance between the door and the structure can be determined or inferred.

Figure 5:
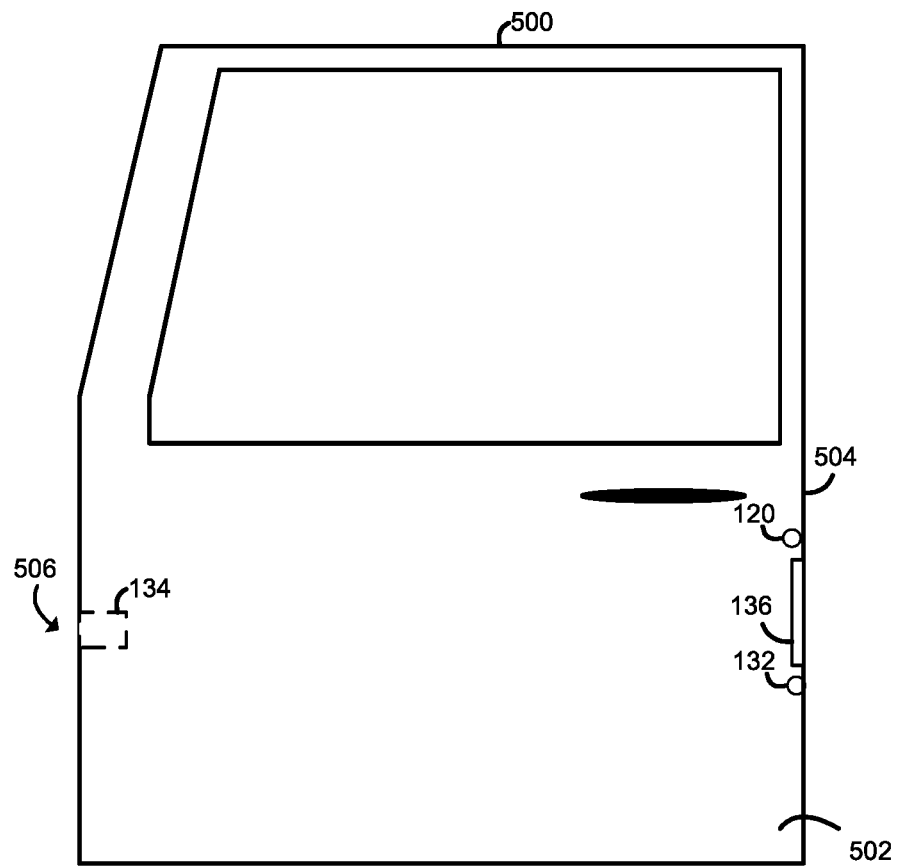
FIG. 5 is a simplified illustration of a door of a vehicle including a door collision avoidance system.

Each proximity sensor 120 is illustratively secured to or otherwise positioned on the door of the vehicle 100 to be monitored. Of course, any number of doors of the vehicle 100 may include one or more corresponding proximity sensors 120. The proximity sensors 120 are located on the corresponding door in a location to facilitate the sensing of nearby external structures while the door is being opened. For example, as shown in FIG. 5, one or more proximity sensors 120 may be located on an outer side 502 of a vehicle door 500 of the vehicle 100, near an outer edge 504 of the door 500. Each monitored door 500 of vehicle 100 may include any number of individual proximity sensors 120 secured, attached, or otherwise incorporated into the door 500 to sense the proximity of the door 500 to a physical structure. Although the following description references the door 500 of the vehicle 100, it should be appreciated that one or more doors of the vehicle 100, including every door, may include one or more proximity sensors 120 and such description is applicable to each monitored door.

The door collision avoidance system 122 may be embodied as any type or collection of devices and/or circuits operable to slow or stop the door 500 of the vehicle 100 from opening and/or colliding with a structure. In the illustrative embodiment, the door collision avoidance system 122 includes an activation circuitry 130 configured to control or activate one or more door collision avoidance devices. For example, as shown in FIG. 1, the door collision avoidance system 122 may include one or more electromagnets 132, one or more actuators 134, and/or one or more electro active polymer (EAP) guards 136 coupled to the door 500 the vehicle 100 to prevent or otherwise reduce the likelihood of a collision between the door 500 and a physical structure while the door is being opened.

The electromagnet(s) 132 may be embodied as any type of circuit and/or electrical device capable of generating an electromagnetic field in response to an excitation signal to repulse the door 500 away from a metallic structure or vice-a-versa. As shown in FIG. 5, the electromagnet 132 may be illustratively coupled or secured to the outer side 502 of the door 500 and located near the outer edge 504. In some embodiments, multiple electromagnets 132 may be coupled or secured to the door 500 to increase the overall repulsive electromagnetic field. In use, as discussed in more detail below, the activation circuitry 130 is configured to activate the electromagnet(s) 132 (e.g. via an excitation signal) to cause the electromagnets to generate the repulsive electromagnetic field in response to a determination that the door 500 is within a proximity threshold of a structure. Assuming the structure is metallic (e.g., another vehicle door), the generated electromagnetic field repulses the door 500 away from the structure and, resultantly, slows the opening of the door 500 or otherwise reduces the likelihood of a collision between the door 500 and the metallic structure.

The actuator (s) 134 may be embodied as any type of prime mover device capable of controlling the positioning (e.g., the opening or closing) of the door 500 of the vehicle 100. For example, in some embodiments, the actuator 134 may be embodied as an electrical actuator, such as a linear actuator or the like. However, in other embodiments, the actuator 134 may be embodied as, or otherwise include, a hydraulic actuator. As shown in FIG. 5, one or more actuators 134 may be located in a door jamb of the door 500 and/or the vehicle 100 itself. For example, in an illustrative embodiment, the actuator 134 may be located in the door jamb 506 of the vehicle 100 and mechanically coupled to a hinge or other linkage connection the door 500 to the remainder of the vehicle 100. In such embodiments, the activation circuitry 130 may control operation of the actuator 134 to slow the opening of the door 500, stop the opening of the door 500, and/or close/open the door 500 as desired. In embodiments in which the actuator 134 is embodied as a hydraulic actuator, the activation circuitry 130 may control the hydraulic pressure of the hydraulic actuator 134 to slow, stop, or close/open the door 500 as desired. As such, in use, the activation circuitry 130 may control the actuator 134 to slow or stop the opening of the door 500 of the vehicle 100 in response to a determination that the door 500 is within a proximity threshold of a structure. It should be appreciated that the use of the actuator 134 may reduce the likelihood of a collision between the door 500 and a structure regardless of the physical makeup of the structure (e.g., even if the structure is non-metallic).

The EAP guard(s) 136 may be embodied as any type of electro active polymer capable of being secured to the vehicle 100 and having a shape or structure that is controllable or configurable via a corresponding electric field. For example, the EAP guard 136 may be embodied as a door edge guard capable of changing its shape (e.g., expanding outwardly from the door 500) to provide an amount of protection to the door 500 from collisions with structures. As shown in FIG. 5, the EAP guard 136 may be secured or attached to the outer side 502 of the door 500 near the outer edge 504. In some embodiments, the EAP guard 136 may be inset into a suitable recess defined in the outer side 502 of the door 500 such that the EAP guard 136 is relatively flush with the outer side 502 when inactivated. However, when activated via a corresponding electric field, the EAP guard 136 may expand out of such recess to define a door guard to protect the door 500 from collisions. As such, in use, the activation circuitry 130 may activate the EAP guard 136 to provide an amount of physical protection for the door 500 in response to a determination that the door 500 is within a proximity threshold of a structure.

The communication circuit 124 may be embodied as any type of communication circuit, device, or collection thereof, capable of enabling communications between the in-vehicle compute device 102 and other remote devices and/or systems. For example, the communication circuit 124 may facilitate communications between the in-vehicle compute device 102 and one more occupant notification systems 160 of the vehicle 100 via an in-vehicle network 162. Additionally or alternatively, the communication circuit 124 may facilitate communications between the in-vehicle compute device 102 and one more remote compute devices, such as a mobile compute device 170 of an occupant of the vehicle 100, via a network 172. To do so, the communication circuit 124 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The output devices 126 may include, or be embodied as, any type of output device capable of providing a notification or alert to an occupant of the vehicle 100 (e.g., the particular occupant in the process of opening the door 500 when the door collision avoidance system 122 is activated). In the illustrative embodiment, the output devices 126 include a display 140 and a speaker 142, but may include additional or other components in other embodiments. The display 140 may be embodied as any type of display capable of displaying notifications or other information to an occupant of the vehicle 100. For example, the display 140 may be embodied as a liquid crystal display (LCD), a light emitting diode (LED) display, a cathode ray tube (CRT) display, a plasma display, and/or other display device. In some embodiments, the display 140 may be incorporated into a dash of the vehicle 100 and may be shared by other systems of the vehicle 100 (e.g., an infotainment system, a back-up assist system, etc.). As such, in some embodiments, the display 140 may be embodied as a touchscreen display. The speaker 142 may be embodied as any type of audio generation device, such as a speaker or annunciator, capable of playing audio of the compiled media to the user.

In some embodiments, the in-vehicle compute device 102 may also include one or more vehicle context sensors 150. The vehicle context sensors 150 may be embodied as, or otherwise include, any type of sensor or device capable of generating context data indicative of a context of the vehicle 100. Illustratively, the vehicle context sensors 150 include one or more occupant presence sensors 152 configured to generate context data indicative of the presence of an occupant in the vehicle 100. For example, the occupant presence sensors 152 may be embodied as, or otherwise include, a seat pressure sensor configured to generate sensor data indicative of whether an occupant is presently setting in a monitored seat of the vehicle 100. In some embodiments, the vehicle context sensors 150 may include context sensors capable of generating context data indicative of a context of an external environment of the vehicle 100. For example, the vehicle context sensors 150 may include a camera configured to capture images of the surrounding environment of the exterior of the vehicle 100. Such images may be used by the in-vehicle compute device 102 to determine the presence of a hazard condition related to the door 500 of the vehicle 100 and respond accordingly. For example, in an illustrative embodiment, the in-vehicle compute device 102 may monitor images captured by a camera device of the surrounding exterior environment of the vehicle 100 and activate the door collision avoidance system 122 to close the door 500 in response to a determination that a hazard condition is present (e.g., an approaching vehicle headed toward an opened door 500). Additionally, in some embodiments, the context data may be indicative of a theft or break-in attempt of the vehicle 100. For example, the in-vehicle compute device 102 may monitor the images captured by a camera or other sensor data to detect whether and unauthorized entry is being attempted and, if so, activate the door collision avoidance system 122 to secure the door 500 in a closed position. Similarly, if the door 500 is in an open position, the in-vehicle compute device 102 may be configured to recognize an authorized attempt to enter the vehicle (e.g., based on the image data or other sensor data) and activate the door collision avoidance system 122 to close the door 500. Of course, the in-vehicle compute device 102 may utilize other context data related to the vehicle 100 itself or its surroundings in other embodiments.

The in-vehicle compute device 102 may also include one or more alert devices 154 in some embodiments. The alert devices 154 may be embodied as any type of device capable of generating or producing an alert to an occupant of the vehicle 100. The alert devices 154 may be embodied as, or otherwise include, audible alert devices, visual alert devices, and/or tactile alert devices. For example, in an illustrative embodiment, the alert devices 154 include a tactile alert device coupled to or embedded in an interior handle of the door 500. As such, when the door collision avoidance system 122 is activate to slow or stop the opening of the door 500, the tactile alert device coupled to the interior handle of the door 500 may be activated to provide feedback to notify the occupant that the door collision avoidance system 122 has been activated (and that the door 500 is in danger of a collision).

As discussed above, the in-vehicle compute device 102 may communicate with one or more occupant notification systems 160 of the vehicle 100 over the in-vehicle network 162 to provide a notification to the occupants of the vehicle 100 (e.g., a notification that the door collision avoidance system 122 has been activated). The occupant notification systems 160 may be embodies as or otherwise include any type of system of the vehicle 100 capable of providing a notification to an occupant and communicating with the in-vehicle compute device 102. For example, the occupant notification system may be embodied as, or form part of, an in-vehicle infotainment system, an in-vehicle audio system, a back-up assist system, and/or other system of the vehicle 100. The in-vehicle network 162 may be embodied as any type of communication network of the vehicle 100 capable of facilitating communications between the in-vehicle compute device 102 and the occupant notification systems 160. For example, in some embodiments, the in-vehicle network 162 may be embodied as, or otherwise include a controller area network (CAN) bus of the vehicle 100.

Additionally, as discussed above, the in-vehicle compute device 102 may communicate with one or more mobile compute devices 170 over the network 172 to provide a notification to a user of the mobile compute device 170. The mobile compute device 170 may be embodied as any type of mobile computing device capable of communication with the in-vehicle compute device 102. For example, the mobile compute device 170 may be embodied as or otherwise include, without limitation, a smartphone, a cellular phone, a tablet computer, a notebook computer, a laptop computer, a wearable computer, smart eyeglasses, a smart watch, a head-mounted display unit, a handset, a messaging device, a multiprocessor system, a processor-based system, a consumer electronic device, and/or any other computing device capable of wireless communication. As such, the mobile compute device 170 may include components commonly found in such devices such as a processor, memory, communication circuit, and the like. The network 172 may be embodied as any type of network capable of facilitating communications between the in-vehicle compute device 102 and the mobile compute device 170. For example, the network 172 may be embodied as, or otherwise include, a cellular network, a wireless local area network (LAN), a wireless wide area network (WAN), and/or a publicly-accessible, global network such as the Internet. As such, the network 172 may include any number of additional devices, such as additional computers, routers, and switches, to facilitate communications thereacross.

Figure 2:
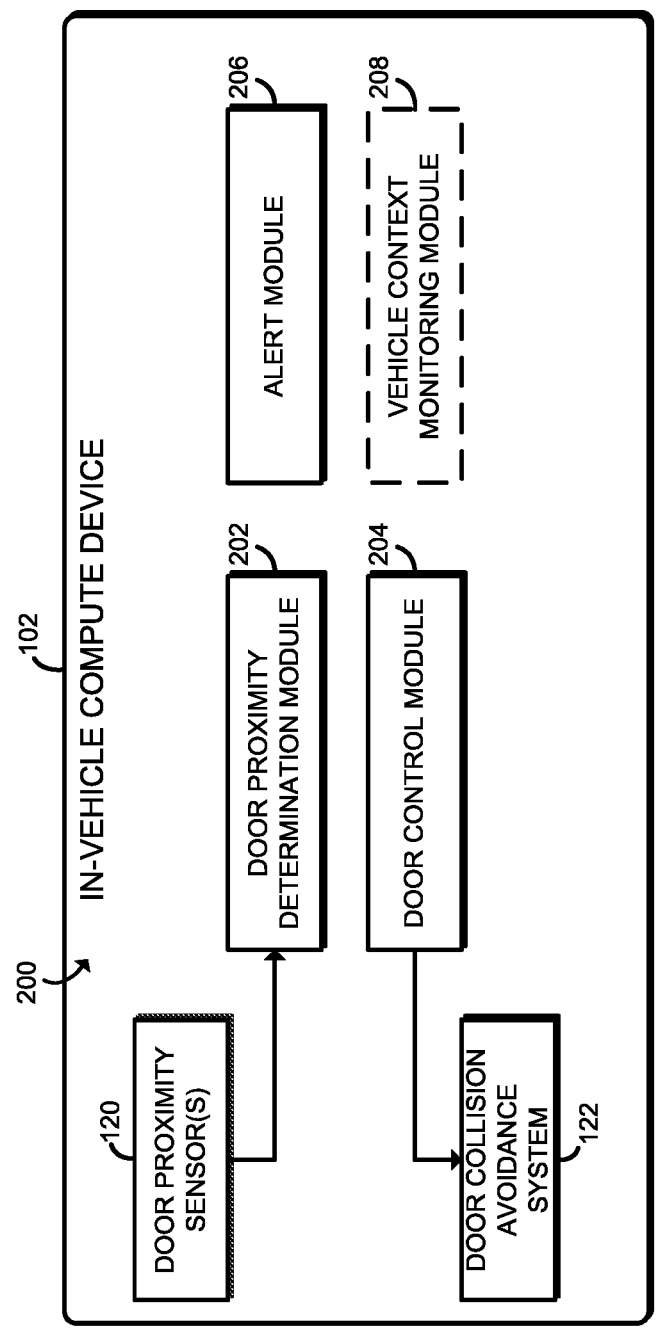
FIG. 2 is a simplified block diagram of at least one embodiment of an environment that may be established by the in-vehicle compute device of FIG. 1.

Referring now to FIG. 2, in use, the in-vehicle compute device 102 is configured to establish an environment 200 for reducing vehicle door collisions. The illustrative environment 200 includes a door proximity determination module 202, a door control module 204, an alert module 206, and in some embodiments, a vehicle context monitoring module 208. The various modules of the environment 200 may be embodied as hardware, software, firmware, or a combination thereof. For example, the various modules, logic, and other components of the environment 200 may form a portion of, or otherwise be established by, the processor 110 or other hardware components of the in-vehicle compute device 102. As such, in some embodiments, one or more of the modules of the environment 200 may be embodied as circuitry or collection of electrical devices (e.g., a door proximity determination circuitry 202, a door control circuitry 204, an alert circuitry 206, and a vehicle context monitoring circuitry 208). It should be appreciated that, in such embodiments, one or more of the door proximity determination circuitry 202, the door control circuitry 204, the alert circuitry 206, and/or the vehicle context monitoring circuitry 208 may form a portion of one or more of the processor 110, the I/O subsystem 112, the memory 114, the door proximity sensors 120, the door collision avoidance system 122, the communication circuitry 124, and/or the output devices 126. Additionally, in some embodiments, one or more of the illustrative modules may form a portion of another module and/or one or more of the illustrative modules may be independent of one another.

The door proximity determination module 202 is configured to determine the proximity of the door 500 of the vehicle 100 relative to one or more external structures while the door 500 is being opened. To do so, the door proximity determination module 202 may monitor the proximity data generated or produced by the door proximity sensors 120. As discussed above, the proximity data may embodied as distance data that directly defines a distance between the door 500 and the structure or as various data from which such distance may be determined or inferred. As such, the door proximity determination module 202 may determine the proximity of the door 500 to the structure in any suitable manner based on the type of proximity data received from the proximity sensors 120.

The door proximity determination module 202 is further configured to compare the determined proximity of the door 500 and structure to a proximity threshold and notify or activate the door control module 204 if the determined proximity is within or otherwise satisfies the proximity threshold. For example, the door proximity determination module 202 may be configured to activate or notify the door control module 204 if the door 500 is determined to be within a reference distance range (e.g., 12 inches) of a structure while being opened.

The door control module 204 is configured to activate or control the door collision avoidance system 122 in response to the notification or activation received from the door proximity determination module 202 indicating that the door 500 is within the proximity threshold to the structure. To do so, as discussed above, the door control module 204 may activate or control any one of the door avoidance collision devices via the activation circuitry 130 to slow or stop the opening of the door 500. For example, the door control module 204 may activate an electromagnet 132 secured to the door 500 to generate an electromagnetic field to repulse the door 500 away from the structure as discussed above. Additionally or alternatively, the door control module 204 may control an actuator 134 operatively coupled to the door 500 to slow or stop the door 500 from opening. Additionally in some embodiments and under certain conditions, the door control module 204 may be configured to control the actuator 134 to close or open the door 500 as discussed in more detail below. The door control module 204 may also be configured to activate an EAP guard 136 secured to the door to cause the EAP guard to expand and provide an amount of physical protection for the door 500 in the case of an actual collision or contact with the structure.

The alert module 206 is configured to generate a notification or alert to notify one or more occupants of the vehicle 100 that the door 500 is in proximity to a structure and/or that the door collision avoidance system 122 has been activated. For example, the alert module 206 may activate one or more of the alert devices 154 (e.g., an audible alert device or a tactile alert device coupled to the interior handle of the door 500) to notify the occupant that the door 500 is in proximity to an external structure while the door 500 is being opened. In some embodiments, the alert module 206 may provide a first alert if the door 500 is within proximity to structure but not close enough for the door collision avoidance system 122 to be activated and provide a second alert, which may be louder or more powerful, if the door collision avoidance system 122 has been activated.

In some embodiments, the alert module 206 may also be configured to provide information, notifications, and alerts to the occupants of the vehicle 100 via one or more of the output devices 126. For example, the alert module 206 may produce a visual of the car door 500 on the display 140 with a warning regarding a possible collision with an external structure. Additionally, the alert module 206 may transmit alerts or notifications regarding the proximity of the door 500 and/or the activation of the door collision avoidance system 122 to the occupant notification systems 160 via the in-vehicle network 162 and/or to the mobile compute device 170 via the network 172. The occupant notification system(s) and/or the mobile compute device 170 may subsequently generate local alerts to notify an occupant or user of the door proximity and/or activation of the door collision avoidance system 122.

As discussed above, the environment 200 may also include the vehicle context monitoring module 208 in some embodiments. In such embodiments, the vehicle context monitoring module 208 is configured to monitor the context data generated or produced by the vehicle context sensors 150 and control operation of the door 500 based on the context data. To do so, the vehicle context monitoring module 208 may communicate with the door control module 204 to control an actuator 134 to open or close the door 500. The vehicle context monitoring module 208 may monitor any type of context of the vehicle 100 and/or the surrounding environment and take any appropriate action to alleviate a hazardous or dangerous condition regarding the door 500. For example, if the vehicle context monitoring module 208 determines that vehicle 100 is in motion and an attempt to open the door 500 from the outside is made, the vehicle context monitoring module 208 may control the actuator 134 to keep the door 500 closed for safety. Similarly, if the vehicle context monitoring module 208 determines that an occupant is presently occupying a seat of the vehicle 100 based on the sensor data from the occupant presence sensor 152, the vehicle context monitoring module 208 may control the actuator 134 to keep the door 500 closed in response to an attempt to open the door 500 from the outside. Further, if the door 500 is presently opened, the vehicle context monitoring module 208 may control the actuator 134 to close the door 500 in response to determining the presence of a hazard condition to the door 500 (e.g., an indication of an approaching vehicle based on images generated by a camera of the vehicle context sensors 150). Additionally, if the vehicle context monitoring module 208 determines that an authorized entry into the vehicle 100 and/or theft from the vehicle 100 is being attempted, the vehicle context monitoring module 208 may control the actuator 134 to open, close, or secure the door 500 as appropriate. Of course, the vehicle context monitoring module 208 may monitor other context data and take other actions in response to such context data in other embodiments.

Figure 3:
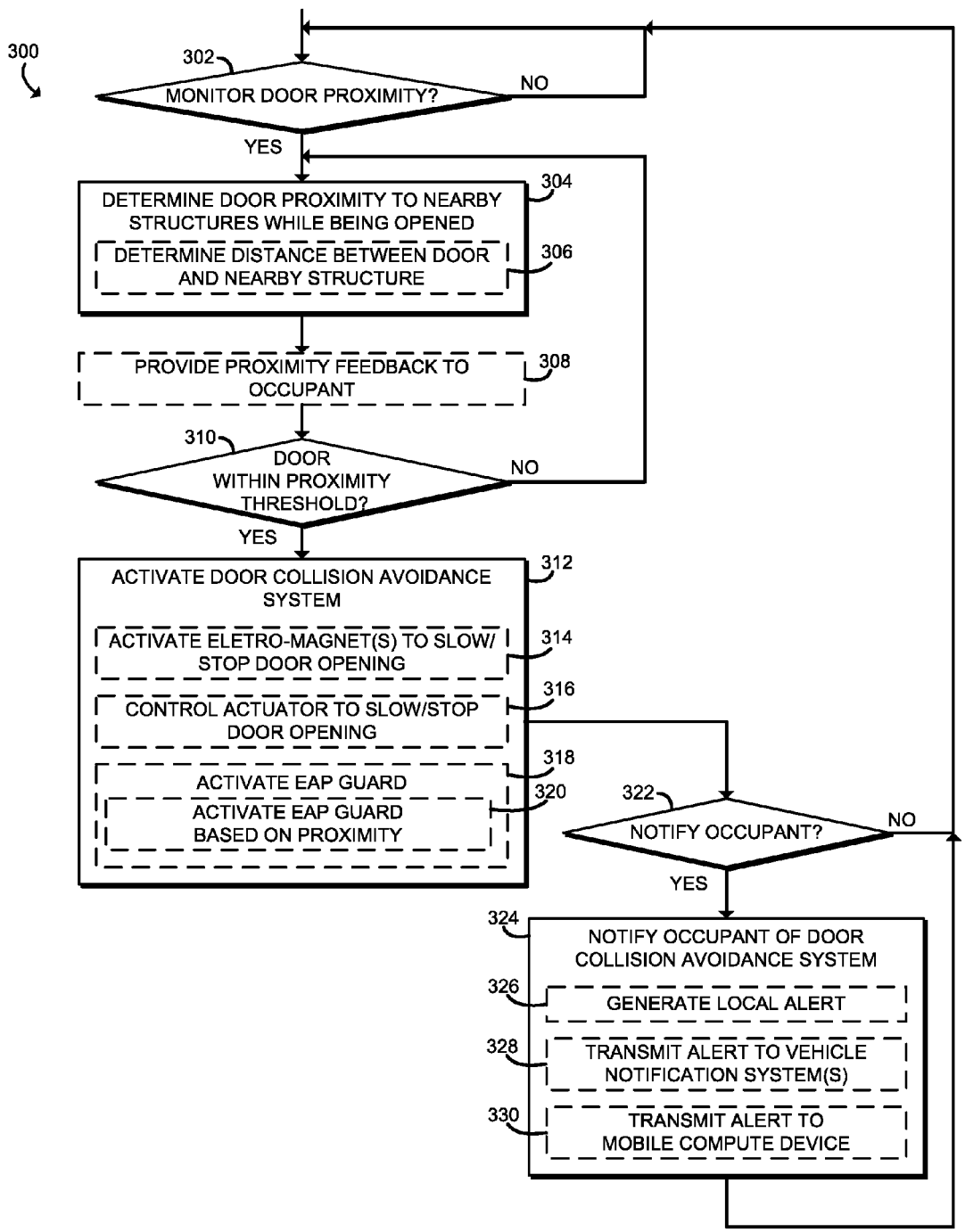
FIG. 3 is a simplified flow diagram of at least one embodiment of a method for reducing vehicle door collisions that may be executed by the in-vehicle compute device of FIGS. 1 and 2.

Referring now to FIG. 3, in use, the in-vehicle compute device 102 may execute a method 300 for reducing vehicle door collisions. The method 300 begins with block 302 in which the in-vehicle compute device 102 determines whether to monitor the proximity of one or more doors 500 of the vehicle 100 relative to external structures. For example, in some embodiments, the in-vehicle compute device 102 may be configured to monitor the proximity of the door 500 only when the door 500 is opened or in the process of being opened. Additionally, in some embodiments, the door proximity monitoring capability of the in-vehicle compute device 102 may be toggled on/off by an operator of the vehicle 100. Regardless, if the in-vehicle compute device 102 determines to monitor door proximity, the method 300 advances to block 304 in which the in-vehicle compute device 102 determines the proximity of the monitored door 500 relative to one or more external structures or objects while the door 500 is being opened. For example, in block 306, the in-vehicle compute device 102 may determine a distance between the door 500 and one or more external structures near the door 500 while the door 500 is being opened. To do so, the in-vehicle compute device 102 may monitor the proximity data generated or produced by the door proximity sensors 120 as discussed in detail above.

In some embodiments, in block 308, the in-vehicle compute device 102 may provide feedback to the occupant based on the proximity of the door 500 to the external structure. For example, the in-vehicle compute device 102 may provide feedback, such as tactile feedback on an interior handle of the door 500, to an occupant of the vehicle 100 in the process of opening the door 500. It should be appreciated that such feedback may be provided prior to the activation of the door collision avoidance system 122 as an initial warning or notification to the occupant (e.g., the door 500 is within proximity of a structure but not yet close enough to cause activation of the door collision avoidance system 122). In some embodiments, the feedback may be adjusted or based on the present distance between the door 500 and the structure. For example, an audible alert may become louder and/or a tactile alert may become more powerful as the door 500 is moved closer to the structure.

In block 310, the in-vehicle compute device 102 determines whether the door 500 is within a reference proximity threshold (e.g., within 12 inches) of the external structure. If not, the method 300 loops back to block 304 to continue monitoring the proximity data generated or produced by the proximity sensors 120. However, if the door 500 is determined to be within the proximity threshold of the structure, the method 300 advances to block 312 in which the door collision avoidance system 122 is activated to slow or stop the opening of the door. To do so, as discussed above, the in-vehicle compute device 102 may activate an electromagnet 132 secured to the door 500 to generate an electromagnetic field to repulse the door 500 away from the structure in block 314. Additionally or alternatively, the in-vehicle compute device 102 may control an actuator 134 operatively coupled to the door 500 to slow or stop the door 500 from opening in block 316. Further, the in-vehicle compute device 102 may activate an EAP guard 136 secured to the door 500 to cause the EAP guard 136 to provide an amount of physical protection for the door 500 in the case of an actual collision with the structure in block 318. In some embodiments, in block 320, the EAP guard 136 may be activated based on the present proximity of the door 500 to the structure. For example, the in-vehicle compute device 102 may activate the EAP guard 136 only when the door 500 is in closer proximity to the structure than when the other collision avoidance devices (e.g., the electromagnet 132 or actuator 134) are activated. That is, because the EAP guard 136 is configured to reduce damage to the door 500 in the event of an actual collision, the activation of the EAP guard 136 may occur after activation of other collision avoid ace devices. Of course, as discussed above, the in-vehicle compute device 102 may activate or control other devices to slow or stop the door 500 from opening and/or perform other functions in block 312.

After the door collision avoidance system 122 has been activated, the method 300 advance to block 322 in which the in-vehicle compute device 102 determines whether to notify one or more occupants of the vehicle 100 of such activation. For example, the in-vehicle compute device 102 may be configured to always provide a notification or may provide such notifications only under certain conditions. If no notification is to be provided, the method 300 loops back to block 302 in which the in-vehicle compute device 102 determines whether to continue monitoring the proximity of the door 500 to external structures. However, if the in-vehicle compute device 102 determines that a notification is to be issued, the method 300 advances to block 324 in which the in-vehicle compute device 102 provides a notification to occupants of the vehicle 100 that the door collision avoidance system 122 has been activated. For example, in block 326, the in-vehicle compute device 102 may generate a local alert by activating the alert devices 154. For example, the in-vehicle compute device 102 may provide an audible, visual, or tactile alert. Additionally or alternatively, in block 328, the in-vehicle compute device 102 may transmit an alert to one or more of the occupant notification systems 160 of the vehicle 100 via the in-vehicle network 162. In response, the occupant notification system(s) 160 may provide the alert to the occupants. Further, in some embodiments in block 330, the in-vehicle compute device 102 may transmit an alert to the mobile compute device 170 of an occupant of the vehicle via the network 172. After the alert has been generated and/or transmitted, the method 300 loops back to block 302 in which the in-vehicle compute device 102 determines whether to continue monitoring the proximity of the door 500 to external structures.

Figure 4:
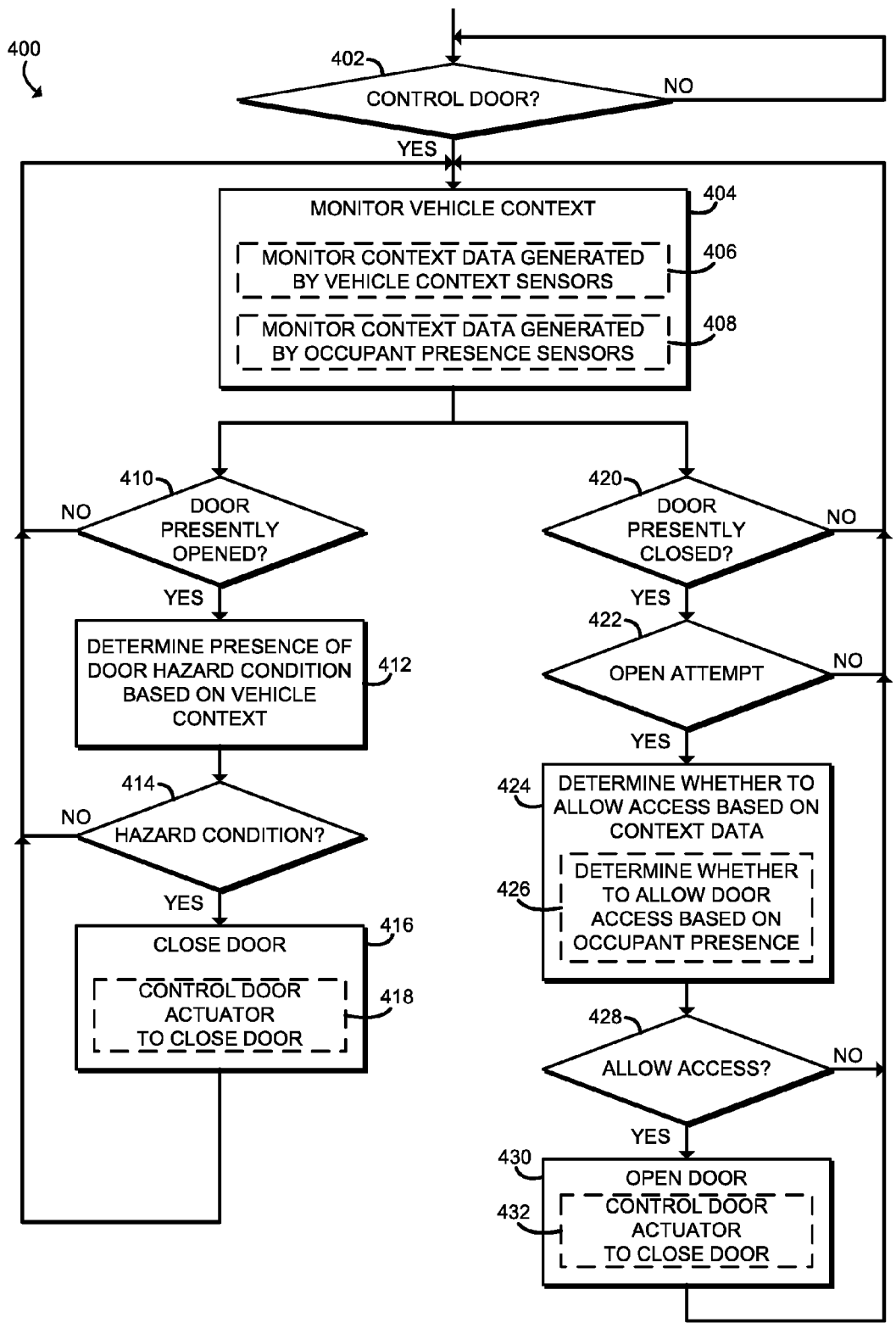
FIG. 4 is a simplified flow diagram of at least one embodiment of a method for controlling a door of a vehicle based on a context associated with the vehicle that may be executed by the in-vehicle compute device of FIGS. 1 and 2.

Referring now to FIG. 4, in use, the in-vehicle compute device 102 may execute a method 400 for controlling a door 500 of the vehicle 100 based on a context of the vehicle 100. The method 400 begins with block 402 in which in-vehicle compute device 102 determines whether to control one or more doors 500 of the vehicle 100 based on the context of the vehicle 100. For example, in some embodiments, the in-vehicle compute device 102 may be configured to control the door 500 at all times or only when requested. Regardless, if the in-vehicle compute device 102 determines to control the door 500 based on the context of the vehicle 100, the method 400 advances to block 404 in which the in-vehicle compute device 102 monitors the context of the vehicle 100. To do so, for example, the in-vehicle compute device 102 may monitor the context data generated by one or more of the vehicle context sensors 150 in block 406. For example, the in-vehicle compute device 102 may monitor images captured by a camera of the external environment of the vehicle 100. Additionally or alternatively, the in-vehicle compute device 102 may monitor the sensor data generated by the one or more occupant presence sensors 152, in block 408, to determine whether an occupant is present in the vehicle 100 (e.g., whether an occupant is presently occupying a specific seat of the vehicle 100).

After block 404, the method 400 advances to both blocks 410 and 420. That is, each of blocks 410, 420 may be executed or performed contemporaneously with each other. In block 410, the in-vehicle compute device 102 determines whether the door 500 is presently opened. If so, the method 400 advances to block 412 in which the in-vehicle compute device 102 determines whether any hazard or danger to the opened door 500 is present based on the monitored context of the vehicle 100. For example, the in-vehicle compute device 102 may analyze images generated by a camera to determine whether an approaching vehicle is in danger of hitting the opened door 500 or whether any other condition exists that may cause damage to the door 500 in its opened. In block 414, if the in-vehicle compute device 102 determines that no hazard condition exists, the method 400 loops back to block 404 in which the in-vehicle compute device 102 continues monitoring the context of the vehicle 100. If, however, the in-vehicle compute device 102 has identified a potential hazard to the opened door 500, the method 400 advances to block 416 in which the in-vehicle compute device 102 closes the opened door 500. To do so, in block 418, the in-vehicle compute device 102 may control an actuator 134 to cause the door 500 to close. Of course, the in-vehicle compute device 102 may be equipped with appropriate sensors to determine whether the closing of the door 500 may cause any injury to an occupant (e.g., an occupant presently leaving the vehicle) and halt or modify the closing of the door 500 accordingly. After the door 500 has been closed in block 416, the method 400 loops back to block 404 in which the in-vehicle compute device 102 continues monitoring the context of the vehicle 100.

Referring back to block 420, the in-vehicle compute device 102 determines whether the door 500 is presently closed. If so, the method 400 advances to block 422 in which in-vehicle compute device 102 determines whether an attempt to open the door 500 from the outside has been made. For example, the in-vehicle compute device 102 may monitor the operation of an outside handle of the door 500 to determine whether an access attempt has been made. If not, the method 400 loops back to block 404 in which the in-vehicle compute device 102 continues monitoring the context of the vehicle 100. If, however, an attempt to open the closed door 500 has been made, the method 400 advances to block 424 in which the in-vehicle compute device 102 determines whether to allow the opening of the door 500 based on the context data of the vehicle 100. In the illustrative embodiment, in block 426, the in-vehicle compute device 102 determines whether to allow the opening of the door 500 based on the sensor data generated by the occupant presence sensors 152. For example, the in-vehicle compute device 102 may determine whether to allow the opening of the door 500 based on whether an occupant is presently occupying the seat closest to the door 500. Of course, the in-vehicle compute device 102 may utilize additional or other context data to determine whether to allow the opening of the door 500. For example, the in-vehicle compute device 102 may consider whether the vehicle is in motion, the speed of the vehicle, the state of any door locks, a theft attempt, and/or other context data. In block 428, if the in-vehicle compute device 102 determines not to allow the opening of the door 500, the in-vehicle compute device 102 maintains the door 500 in the closed state and the method 400 loops back to block 404 in which the in-vehicle compute device 102 continues monitoring the context of the vehicle 100. If, however, the in-vehicle compute device 102 determines to allow the opening of the door 500, the method 400 advances to block 430 in which the in-vehicle compute device 102 opens the door 500. To do so, the in-vehicle compute device 102 may control an actuator 134 to cause the door 500 to open. In some embodiments, the in-vehicle compute device 102 may subsequently control the actuator 134 to close the door in block 432. After the door 500 has been opened in block 430, method 400 loops back to block 404 in which the in-vehicle compute device 102 continues monitoring the context of the vehicle 100.

EXAMPLES

Illustrative examples of the technologies disclosed herein are provided below. An embodiment of the technologies may include any one or more, and any combination of, the examples described below.

Example 1 includes an in-vehicle compute system to reduce vehicle door collisions, the in-vehicle compute system comprising one or more proximity sensors to generate proximity data indicative of a proximity of a door of a vehicle to a structure; a door collision avoidance system to control the opening of the door; a door proximity determination module to determine, based on the proximity data, whether the door of the vehicle is within a proximity threshold of the structure while the door is being opened; a door control module to activate the door collision avoidance system in response to a determination that the vehicle door is within the proximity threshold of the structure to slow the opening of the door of the vehicle.

Example 2 includes the subject matter of Example 1, and wherein the door collision avoidance system comprises an electro-magnet, and wherein to activate the door collision avoidance system comprises to energize the electro-magnet to generate an electromagnetic field to repulse the door away from the structure.

Example 3 includes the subject matter of any of Examples 1 and 2, and wherein the electro-magnet is located on an outer side of the door of the vehicle.

Example 4 includes the subject matter of any of Examples 1-3, and wherein the door collision avoidance system comprises an actuator, and wherein to activate the door collision avoidance system comprises to control the actuator of the vehicle to slow the opening of the door.

Example 5 includes the subject matter of any of Examples 1-4, and wherein the actuator is operatively coupled to a hinge of the door to slow the opening of the door.

Example 6 includes the subject matter of any of Examples 1-5, and wherein the actuator comprises a hydraulic actuator, and wherein to activate control the actuator of the vehicle comprises to control the hydraulic actuator to increase a hydraulic force of the hydraulic actuator to slow the opening of the door.

Example 7 includes the subject matter of any of Examples 1-6, and wherein the door collision avoidance system comprises an electro-active polymer device coupled to an outer surface of the door, and wherein to activate the door collision avoidance system comprises activate the electro-active polymer device.

Example 8 includes the subject matter of any of Examples 1-7, and wherein the electro-active polymer device is coupled on an outer edge of the outer surface of the door.

Example 9 includes the subject matter of any of Examples 1-8, and wherein to activate the door collision avoidance system comprises activate the door collision avoidance to stop the opening of the door.

Example 10 includes the subject matter of any of Examples 1-9, and wherein to activate the door collision avoidance system comprises to activate the door collision avoidance to close the door.

Example 11 includes the subject matter of any of Examples 1-10, and wherein the one or more proximity sensors comprise a proximity sensor secured to an outer side of the door, and wherein to determine whether the door of the vehicle is within the proximity threshold of the structure comprises to monitor proximity sensor data generated by the proximity sensor secured to the outer side of the door.

Example 12 includes the subject matter of any of Examples 1-11, and wherein to determine whether the door of the vehicle is within the proximity threshold of the structure comprises to determine a distance between the door and the structure.

Example 13 includes the subject matter of any of Examples 1-12, and further including an alert module to provide feedback to an occupant of the vehicle based on a present proximity of the door to the structure.

Example 14 includes the subject matter of any of Examples 1-13, and further including a tactile alert device coupled to a handle of the door, and wherein to provide feedback to the occupant comprises to control the tactile alert device to provide a tactile feedback on the handle of the door, wherein a magnitude of the feedback is based on a magnitude of the present proximity of the door to the structure.

Example 15 includes the subject matter of any of Examples 1-14, and further including further comprising an alert module to notify an occupant of the vehicle that the door collision avoidance system has been activated.

Example 16 includes the subject matter of any of Examples 1-15, and wherein to notify the occupant comprises to generate a local alert within the vehicle, wherein the local alert is configured to provide notification to the occupant that the door collision avoidance system has been activated.

Example 17 includes the subject matter of any of Examples 1-16, and wherein to notify the occupant comprises to transmit an alert to a vehicle notification system over an in-vehicle network to provide a notification to the occupant that the door collision avoidance system has been activated.

Example 18 includes the subject matter of any of Examples 1-17, and wherein to notify the occupant comprises to transmit an alert to a mobile computing device over a network, wherein the alert is configured to provide notification to a user of the mobile computing device that the door collision avoidance system has been activated.

Example 19 includes the subject matter of any of Examples 1-18, and further including an actuator operatively coupled to the door to control the opening of the door; and a vehicle context monitoring module to monitor a vehicle context associated with the vehicle, and wherein the door control module is further to (i) determine whether the door of the vehicle is in an opened position, (ii) determine whether a hazard condition is present based on the vehicle context and a determination that the door of the vehicle is in the opened position, and activate the actuator to close the door in response to a determination that the hazard condition is present.

Example 20 includes the subject matter of any of Examples 1-19, and further including an actuator operatively coupled to the door to control the opening of the door; and a vehicle context monitoring module to monitor a vehicle context associated with the vehicle, and wherein the door control module is further to (i) determine whether the door of the vehicle is in a closed position, (ii) determine whether an attempt to open the door has been initiated from outside the vehicle, and (iii) activate the actuator of the vehicle to open the door based on the vehicle context and in response to a determination that an attempt to open the door has been initiated.

Example 21 includes the subject matter of any of Examples 1-20, and further including an occupant presence sensor to generate sensor data indicative of whether an occupant is presently occupying a seat associated with the door, and wherein the door control module is further to activate the actuator of the vehicle to restrict the opening of the door in response to a determination that an attempt to open the door has been initiated and the seat is occupied by the occupant of the vehicle.

Example 22 includes a method for reducing vehicle door collisions, the method comprising determining, by an in-vehicle compute device, whether a door of a vehicle is within a proximity threshold of a structure while the door is being opened; and activating, by the in-vehicle compute device and in response to a determination that the vehicle door is within the proximity threshold of the structure, a door collision avoidance system of the in-vehicle compute device to slow the opening of the door of the vehicle.

Example 23 includes the subject matter of Example 22, and wherein activating the door collision avoidance system comprises energizing an electro-magnet to generate an electromagnetic field to repulse the door away from the structure.

Example 24 includes the subject matter of any of Examples 22 and 23, and wherein energizing the electro-magnet comprises energizing an electro-magnet located on an outer side of the door of the vehicle.

Example 25 includes the subject matter of any of Examples 22-24, and wherein activating the door collision avoidance system comprises controlling an actuator of the vehicle to slow the opening of the door.

Example 26 includes the subject matter of any of Examples 22-25, and wherein controlling the actuator comprises controlling an actuator operatively coupled to a hinge of the door to slow the opening of the door.

Example 27 includes the subject matter of any of Examples 22-26, and wherein activating the door collision avoidance system comprises controlling a hydraulic actuator of the vehicle to increase a hydraulic force of the hydraulic actuator to slow the opening of the door.

Example 28 includes the subject matter of any of Examples 22-27, and wherein activating the door collision avoidance system comprises activating an electro-active polymer device coupled to an outer surface of the door.

Example 29 includes the subject matter of any of Examples 22-28, and wherein activating the electro-active polymer device comprises activating an electro-active polymer device coupled on an outer edge of the outer surface of the door.

Example 30 includes the subject matter of any of Examples 22-29, and wherein activating the door collision avoidance system comprises activating the door collision avoidance to stop the opening of the door.

Example 31 includes the subject matter of any of Examples 22-30, and wherein activating the door collision avoidance system comprises activating the door collision avoidance to close the door.

Example 32 includes the subject matter of any of Examples 22-31, and wherein determining whether the door of the vehicle is within the proximity threshold of the structure comprises monitoring sensor data generated by a proximity sensor secured to an outer side of the door.

Example 33 includes the subject matter of any of Examples 22-32, and wherein determining whether the door of the vehicle is within the proximity threshold of the structure comprises determining a distance between the door and the structure.

Example 34 includes the subject matter of any of Examples 22-33, and further including providing, by an in-vehicle compute device, feedback to an occupant of the vehicle based on a present proximity of the door to the structure.

Example 35 includes the subject matter of any of Examples 22-34, and wherein providing feedback to the occupant comprises providing a tactile feedback on a handle of the door, wherein a magnitude of the feedback is based on a magnitude of the present proximity of the door to the structure.

Example 36 includes the subject matter of any of Examples 22-35, and further including notifying, by the in-vehicle compute device, an occupant of the vehicle that the door collision avoidance system has been activated.

Example 37 includes the subject matter of any of Examples 22-36, and wherein notifying the occupant comprises generating a local alert within the vehicle, wherein the local alert is configured to provide notification to the occupant that the door collision avoidance system has been activated.

Example 38 includes the subject matter of any of Examples 22-37, and wherein notifying the occupant comprises transmitting an alert to a vehicle notification system over an in-vehicle network to provide a notification to the occupant that the door collision avoidance system has been activated.

Example 39 includes the subject matter of any of Examples 22-38, and wherein notifying the occupant comprises transmitting an alert to a mobile computing device over a network, wherein the alert is configured to provide notification to a user of the mobile computing device that the door collision avoidance system has been activated.

Example 40 includes the subject matter of any of Examples 22-39, and further including monitoring, by the in-vehicle compute device, a vehicle context associated with the vehicle; determining, by the in-vehicle compute device, whether the door of the vehicle is in an opened position; determining, by the in-vehicle compute device, whether a hazard condition is present based on the vehicle context and a determination that the door of the vehicle is in the opened position; and activating, by the in-vehicle compute device, an actuator of the vehicle to close the door in response to a determination that the hazard condition is present.

Example 41 includes the subject matter of any of Examples 22-40, and further including monitoring, by the in-vehicle compute device, a vehicle context associated with the vehicle; determining, by the in-vehicle compute device, whether the door of the vehicle is in a closed position; determining, by the in-vehicle compute device, whether an attempt to open the door has been initiated from outside the vehicle; and activating, by the in-vehicle compute device, an actuator of the vehicle to open the door based on the vehicle context and in response to a determination that an attempt to open the door has been initiated.

Example 42 includes the subject matter of any of Examples 22-41, and wherein monitoring the vehicle context comprises determining whether a seat associated with the door is presently occupied by an occupant of the vehicle, and further comprising activating, by the in-vehicle compute device, the actuator of the vehicle to restrict the opening of the door in response to a determination that an attempt to open the door has been initiated and the seat is occupied by the occupant of the vehicle.

Example 43 includes one or more machine-readable storage media comprising a plurality of instructions stored thereon that, when executed, cause in-vehicle compute system to perform the method of any of Examples 22-42.

Example 44 includes an in-vehicle compute system to reduce vehicle door collisions, the in-vehicle compute system comprising means for determining whether a door of a vehicle is within a proximity threshold of a structure while the door is being opened; and means for activating, in response to a determination that the vehicle door is within the proximity threshold of the structure, a door collision avoidance system of the in-vehicle compute device to slow the opening of the door of the vehicle.

Example 45 includes the subject matter of Example 44, and wherein the means for activating the door collision avoidance system comprises means for energizing an electro-magnet to generate an electromagnetic field to repulse the door away from the structure.

Example 46 includes the subject matter of any of Examples 44 and 45, and wherein the means for energizing the electro-magnet comprises means for energizing an electro-magnet located on an outer side of the door of the vehicle.

Example 47 includes the subject matter of any of Examples 44-46, and wherein the means for activating the door collision avoidance system comprises means for controlling an actuator of the vehicle to slow the opening of the door.

Example 48 includes the subject matter of any of Examples 44-47, and wherein the means for controlling the actuator comprises means for controlling an actuator operatively coupled to a hinge of the door to slow the opening of the door.

Example 49 includes the subject matter of any of Examples 44-48, and wherein the means for activating the door collision avoidance system comprises controlling a hydraulic actuator of the vehicle to increase a hydraulic force of the hydraulic actuator to slow the opening of the door.

Example 50 includes the subject matter of any of Examples 44-49, and wherein the means for activating the door collision avoidance system comprises means for activating an electro-active polymer device coupled to an outer surface of the door.

Example 51 includes the subject matter of any of Examples 44-50, and wherein the means for activating the electro-active polymer device comprises means for activating an electro-active polymer device coupled on an outer edge of the outer surface of the door.

Example 52 includes the subject matter of any of Examples 44-51, and wherein the means for activating the door collision avoidance system comprises means for activating the door collision avoidance to stop the opening of the door.

Example 53 includes the subject matter of any of Examples 44-52, and wherein the means for activating the door collision avoidance system comprises means for activating the door collision avoidance to close the door.

Example 54 includes the subject matter of any of Examples 44-53, and wherein the means for determining whether the door of the vehicle is within the proximity threshold of the structure comprises means for monitoring sensor data generated by a proximity sensor secured to an outer side of the door.

Example 55 includes the subject matter of any of Examples 44-54, and wherein the means for determining whether the door of the vehicle is within the proximity threshold of the structure comprises means for determining a distance between the door and the structure.

Example 56 includes the subject matter of any of Examples 44-55, and further including means for providing feedback to an occupant of the vehicle based on a present proximity of the door to the structure.

Example 57 includes the subject matter of any of Examples 44-56, and wherein the means for providing feedback to the occupant comprises means for providing a tactile feedback on a handle of the door, wherein a magnitude of the feedback is based on a magnitude of the present proximity of the door to the structure.

Example 58 includes the subject matter of any of Examples 44-57, and further including the means for comprising notifying an occupant of the vehicle that the door collision avoidance system has been activated.

Example 59 includes the subject matter of any of Examples 44-58, and wherein the means for notifying the occupant comprises means for generating a local alert within the vehicle, wherein the local alert is configured to provide notification to the occupant that the door collision avoidance system has been activated.

Example 60 includes the subject matter of any of Examples 44-59, and wherein the means for notifying the occupant comprises means for transmitting an alert to a vehicle notification system over an in-vehicle network to provide a notification to the occupant that the door collision avoidance system has been activated.

Example 61 includes the subject matter of any of Examples 44-60, and wherein the means for notifying the occupant comprises means for transmitting an alert to a mobile computing device over a network, wherein the alert is configured to provide notification to a user of the mobile computing device that the door collision avoidance system has been activated.

Example 62 includes the subject matter of any of Examples 44-61, and further including means for monitoring a vehicle context associated with the vehicle; means for determining whether the door of the vehicle is in an opened position; means for determining whether a hazard condition is present based on the vehicle context and a determination that the door of the vehicle is in the opened position; and means for activating an actuator of the vehicle to close the door in response to a determination that the hazard condition is present.

Example 63 includes the subject matter of any of Examples 44-62, and further including means for monitoring a vehicle context associated with the vehicle; means for determining whether the door of the vehicle is in a closed position; means for determining whether an attempt to open the door has been initiated from outside the vehicle; and means for activating an actuator of the vehicle to open the door based on the vehicle context and in response to a determination that an attempt to open the door has been initiated.

Example 64 includes the subject matter of any of Examples 44-62, and wherein the means for monitoring the vehicle context comprises means for determining whether a seat associated with the door is presently occupied by an occupant of the vehicle, and further comprising means for activating the actuator of the vehicle to restrict the opening of the door in response to a determination that an attempt to open the door has been initiated and the seat is occupied by the occupant of the vehicle.

The invention claimed is:

1. An in-vehicle compute system to reduce vehicle door collisions, the in-vehicle compute system comprising:
   one or more proximity sensors to generate proximity data indicative of a proximity of a door of a vehicle to a structure;
   a door collision avoidance system comprising a first door collision avoidance device and a second door collision avoidance device, wherein the first door collision avoidance device comprises an activation circuit configured to control the opening of the door and the second door collision avoidance device comprises an electro-active polymer device coupled to an outer surface of the door;
   a door proximity determination module to determine, based on the proximity data, whether the door of the vehicle is within a first proximity threshold or a second proximity threshold of the structure, less than the first proximity threshold, while the door is being opened; and
   a door control module to (i) activate the first door collision avoidance device in response to a determination that the vehicle door is within the first proximity threshold of the structure to slow the opening of the door of the vehicle and (ii) activate the second door collision avoidance device in response to a determination that the vehicle door is within the second proximity threshold of the structure.

2. The in-vehicle compute system of claim 1, wherein the door collision avoidance system comprises an electro-magnet secured to an outside of the door of the vehicle, and
   wherein to activate the activation circuit of the door collision avoidance system comprises to energize the electro-magnet to generate an electromagnetic field.

3. The in-vehicle compute system of claim 1, wherein the door collision avoidance system comprises an actuator, and
   wherein to activate the activation circuit of the door collision avoidance system comprises to control the actuator of the vehicle to slow the opening of the door.

4. The in-vehicle compute system of claim 3, wherein the actuator comprises a hydraulic actuator, and
   wherein to control the actuator of the vehicle comprises to control the hydraulic actuator to increase a hydraulic force of the hydraulic actuator to slow the opening of the door.

5. The in-vehicle compute system of any of claims 1, wherein to activate the activation circuit of the door collision avoidance system comprises activate the door collision avoidance to stop the opening of the door or to close the door.

6. The in-vehicle compute system of any of claims 1, wherein the one or more proximity sensors comprise a proximity sensor secured to an outer side of the door, and
   wherein to determine whether the door of the vehicle is within the first proximity threshold or the second proximity threshold of the structure comprises to monitor proximity sensor data generated by the proximity sensor secured to the outer side of the door.

7. The in-vehicle compute system of any of claims 1, wherein to determine whether the door of the vehicle is within the first proximity threshold or the second proximity threshold of the structure comprises to determine a distance between the door and the structure.

8. The in-vehicle compute system of claim 7, further comprising:
   a tactile alert device coupled to a handle of the door; and comprising an alert module to control the tactile alert device to provide a tactile feedback on the handle of the door, wherein a magnitude of the feedback is based on a magnitude of the present proximity of the door to the structure.

9. One or more non-transitory, machine-readable storage media comprising a plurality of instructions stored thereon that, when executed, cause in-vehicle compute system to:
   determine whether a door of a vehicle is within a first proximity threshold or a second proximity threshold of a structure, less than the first proximity threshold, while the door is being opened;
   activate a first door collision avoidance device of the in-vehicle compute device in response to a determination that the vehicle door is within the first proximity threshold of the structure to slow the opening of the door of the vehicle, wherein the first door collision avoidance device comprises an activation circuit configured to control the opening of the door; and
   activate a second door collision avoidance device coupled to an outer surface of the door in response to a determination that the vehicle door is within the second proximity threshold of the structure, wherein the second door collision avoidance device comprises an electro-active polymer device coupled to an outer surface of the door.

10. The one or more non-transitory, machine-readable storage media of claim 9, wherein to activate the activation circuit of the door collision avoidance system comprises to energize an electro-magnet secured to an outside of the door of the vehicle to generate an electromagnetic field.

11. The one or more non-transitory, machine-readable storage media of claim 9, wherein to activate the activation circuit of the door collision avoidance system comprises to control an actuator of the vehicle to slow the opening of the door.

12. The one or more non-transitory, machine-readable storage media of claim 11, wherein to activate the activation circuit of the door collision avoidance system comprises to control a hydraulic actuator of the vehicle to increase a hydraulic force of the hydraulic actuator to slow the opening of the door.

13. The one or more non-transitory, machine-readable storage media of claim 9, wherein to activate the activation circuit of the door collision avoidance system comprises to activate the door collision avoidance system to stop the opening of the door or to close the door.

14. The one or more non-transitory, machine-readable storage media of claim 9, wherein to determine whether the door of the vehicle is within the first proximity threshold or the second proximity threshold of the structure comprises to monitor sensor data generated by a proximity sensor secured to an outer side of the door.

15. The one or more non-transitory, machine-readable storage media of claim 9, wherein to determine whether the door of the vehicle is within the first proximity threshold or the second proximity threshold of the structure comprises to determine a distance between the door and the structure.

16. A method for reducing vehicle door collisions, the method comprising:
   determining, by an in-vehicle compute device, whether a door of a vehicle is within a first proximity threshold and a second proximity threshold of a structure, less than the first proximity threshold, while the door is being opened; and activating a first door collision avoidance device of the in-vehicle compute device in response to a determination that the vehicle door is within the first proximity threshold of the structure to slow the opening of the door of the vehicle, wherein the first door collision avoidance device comprises an activation circuit configured to control the opening of the door; and activating a second door collision avoidance device coupled to an outer surface of the door after activation of the first door collision avoidance device and in response to a determination that the vehicle door is within the second proximity threshold of the structure, wherein the second door collision avoidance device comprises an electro-active polymer device coupled to an outer surface of the door.

17. The method of claim 16, wherein activating the activation circuit of the door collision avoidance system comprises energizing an electro-magnet secured to an outside of the door of the vehicle to generate an electromagnetic field.

18. The method of claim 16, wherein activating the activation circuit of the door collision avoidance system comprises controlling an actuator of the vehicle to slow the opening of the door.

19. The method of claim 18, wherein activating the activation circuit of the door collision avoidance system comprises controlling a hydraulic actuator of the vehicle to increase a hydraulic force of the hydraulic actuator to slow the opening of the door.

20. The method of claim 16, wherein activating the activation circuit of the door collision avoidance system comprises activating the door collision avoidance to stop the opening of the door or to close the door.

21. The method of claim 16, wherein determining whether the door of the vehicle is within the first proximity threshold or the second proximity threshold of the structure comprises monitoring sensor data generated by a proximity sensor secured to an outer side of the door.

22. The method of claim 16, wherein determining whether the door of the vehicle is within the first proximity threshold or the second proximity threshold of the structure comprises determining a distance between the door and the structure.

* * * * *